(12) United States Patent
Lenz et al.

(10) Patent No.: US 6,279,002 B1
(45) Date of Patent: Aug. 21, 2001

(54) SYSTEM AND PROCEDURE FOR MEASURING THE PERFORMANCE OF APPLICATIONS BY MEANS OF MESSAGES

(75) Inventors: Norbert Lenz, Magstadt; Wolfgang Schawer, Holzgerlingen, both of (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/104,313

(22) Filed: Jun. 25, 1998

(30) Foreign Application Priority Data

Jun. 25, 1997 (DE) .............................. 197 27 036

(51) Int. Cl.[7] .................................... G06F 17/30
(52) U.S. Cl. ................................. 707/10; 714/25
(58) Field of Search .................... 707/9–10; 714/25, 714/47

(56) References Cited

U.S. PATENT DOCUMENTS

| | | | |
|---|---|---|---|
| 4,821,178 | * 4/1989 | Levin et al. | 714/47 |
| 5,581,482 | * 12/1996 | Wiedenman et al. | 702/186 |
| 5,696,701 | * 12/1997 | Burgess et al. | 714/25 |
| 5,742,819 | * 4/1998 | Caccavale | 707/200 |
| 5,913,036 | * 6/1999 | Brownmiller et al. | 709/224 |

* cited by examiner

Primary Examiner—Hosain T. Alam
Assistant Examiner—Jean Bolte Fleurantin
(74) Attorney, Agent, or Firm—Scully, Scott, Murphy & Presser; Wayne L. Ellenbogen, Esq.

(57) ABSTRACT

The present invention describes a system and process for measuring the performance of programs by means of messages, in particular with distributed programs. A corresponding area for performance and/or time entries is added to the message which is to be processed. At each processing stage of the message, a performance and/or time marker is deposited in this area. The performance and/or time marker consists essentially of the identifier of the computer, the identifier of the particular processing stage, a description of the particular processing stage, and performance data and/or a value of the computer time. All the performance and time markers are written into a file for later evaluation, so that data is available at the same time. Thanks to the integrated processing of performance data with application data, the performance analysis, e.g. of response times of definable processing procedures, in particular with distributed networks, is considerably simplified.

23 Claims, 1 Drawing Sheet

SYSTEM AND PROCEDURE FOR MEASURING THE PERFORMANCE OF APPLICATIONS BY MEANS OF MESSAGES

BACKGROUND OF THE INVENTION

1. Technical Field

The present invention describes a procedure for measuring the performance of processing steps in programs or parts of programs by means of messages, particularly in application programs which are distributed over several computers.

2. Prior Art

In distributed applications, program parts run on several computers which are usually different. They communicate with one another by transmitting messages over one or more networks.

It is very difficult to determine the end-to-end response time of transactions in a distributed application and to evaluate large response times in particular.

The determination and evaluation of the end-to-end response time of a transaction in a distributed application is necessary because of the following points:

During the development of an application, performance bottlenecks need to be recognised early and removed through design improvements.

During the installation of a distributed application, performance problems often occur. These are connected to the local configuration of hardware and software not having been tested using the new product. In such cases it is very difficult for the customer to assign an error to one of the products involved.

After the successful commissioning of a distributed application, one will want to measure and evaluate the end-to-end response time of transactions. This is necessary in order to be able to ensure the availability of the application for the user. In addition, one wishes to analyse the end-to-end response time by components in order to recognise the cause of a fault on exceeding a pre-given limit value.

The determination of the end-to-end response time of transactions in distributed applications is technically necessary.

Currently there are a number of procedures for determining the end-to-end response time.

One of the procedures for determining the end-to-end response time is based on the idea of fitting the application parts with instruments so that they can signal the start and end of transactions (or transaction parts) to an agent running outside the application. The agent ensures that the data are brought together centrally and evaluated. In this procedure, the measurements of transaction parts belonging to a transaction call cannot be correlated, i.e. one cannot know which measurement values belong to a particular transaction call. In order to facilitate a correlation, a globally clear identification of the transaction call must be introduced into this procedure. Such an extended procedure is technically complex because the agent is outside the application logic and therefore globally clear identifications are required. As all measurement values for evaluation have to be collected together at a central point, the discovery of associated values from a large number of measurement values is very laborious.

In addition, there are costly hardware monitors with common electronic clocks with which one can monitor system calls over several computers. Hardware monitors are expensive and the instrumentation is very costly. A disadvantage of hardware monitors is in that they cannot supply any data to application levels. Thus calls from operating system services can be counted and measured but the allocation of transactions to an application is difficult. In addition, only computers with the same type of architecture can be monitored. This often does not occur with distributed applications because the servers and clients are usually different.

Otherwise there are the so-called profilers with which one can determine which program parts run on a computer and how often and how much time is spent in which program parts. However, it is not possible to receive coherent information on transaction parts running on different computers.

All the above procedures are based on the application being measured from outside, i.e. the application logic and instrumentation being fully separate or separate as far as is possible.

SUMMARY OF THE INVENTION

The task of the present invention is to suggest a procedure which allows the performance data of transactions to be received together with the application data, so that they are easy to report and that an analysis of the end-to-end response time is very simple.

More specifically, the present invention relates to a process for measuring the performance of processing stages of programs or parts of programs by means of messages in a data-processing system, wherein the message which is to be processed by a program receives an area for entries of performance data and the particular processing stage concerned deposits a performance marker in this area.

The present invention further relates to a process for the determination and evaluation of response times of processing stages of a program or parts of a program by means of messages in a data-processing system, wherein the message which is to be processed in a program receives an area for time entries, and that the processing stage of the particular program deposits a time marker in this area.

Still further, the present invention is directed to a data-processing system containing at least one computer, operating system software and programs, characterised in that the message to be processed by means of a program contains an area for performance and/or time entries, and that the particular processing stage of this message deposits a performance entry and/or time entry in this area.

Even further, the present invention is directed to data carriers containing a program for the performance of a process as described above.

The advantages of the procedure in accordance with the present invention are that the integrated processing of application data and performance data describing a transaction call are combined in a response message. All data are available at one point and at the same time.

As the measurement data belonging to a transaction call are combined in a response message, the different transaction paths taken are also able to be recognised and evaluated. The procedure can be used for both the analysis of design and installation problems as well as for ensuring the availability of applications.

BRIEF DESCRIPTION OF THE DRAWINGS

Preferred embodiments of the present invention will now be described, by way of example only, with reference to the accompanying drawings, in which.

DETAILED DESCRIPTION OF THE PREFERRED EMBODIMENTS OF THE INVENTION

In distributed applications, program parts run on several computers. Examples of distributed applications are bank programs, flight booking programs or database programs. Particularly important is compliance with response times in distributed networks, as compliance with certain response times is an object of the agreement between data processing suppliers and users.

Figure 1:
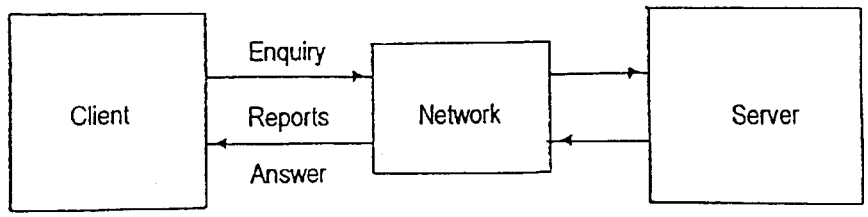
FIG. 1 shows a client-server architecture in which the procedure according to the invention is used to determine the performance data of a transaction call in a distributed application.

FIG. 1 shows a simple distributed application consisting of a client program on a workstation computer connected over a network to the server program on another computer. The client program sends requests to the server program and receives responses. The term for requests and responses is messages. The end-to-end response time from creating a request to receiving the result can be determined through comparing two time measurements in the client program. The duration of individual processing stages of the request/response cannot, however be determined in this way.

Figure 2A:
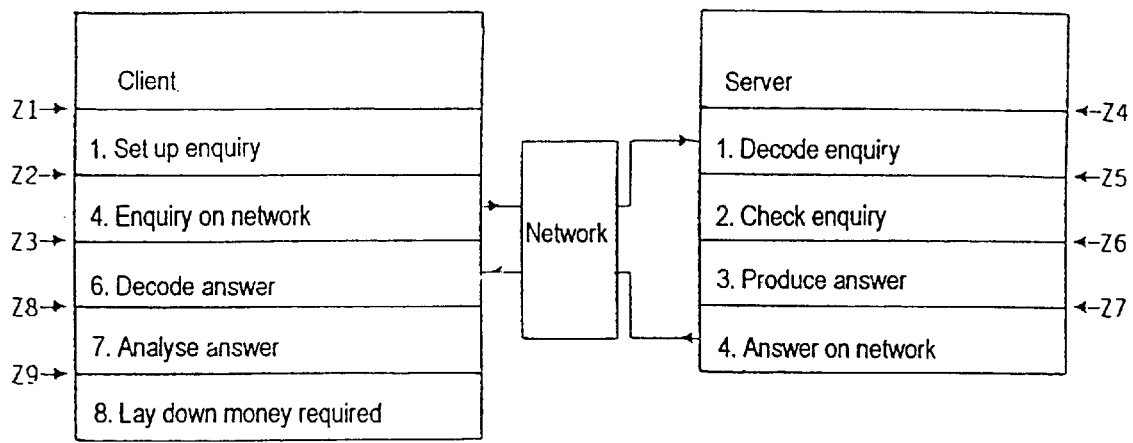
FIG. 2A shows the procedure according to the invention using as an example a distributed application in a client-server architecture.

FIG. 2A shows the individual processing stages in executing a request in a distributed network. An example of this is the request for payment of a certain sum of money from a cash-point machine. This request can be broken down into the following processing stages, as FIG. 2A shows:

1. Request created by client (e.g. payment of money)
2. Request goes to the network
3. Request is decoded by the server
4. Request funds is checked by the server (e.g. there sufficient funds in the account)
5. Response created by the server (e.g. pay the amount requested)
6. Response goes from network to client
7. Response is decoded by client
8. Response is analysed by client
9. Response is carried out (the sum of money is paid out).

Figure 2B:
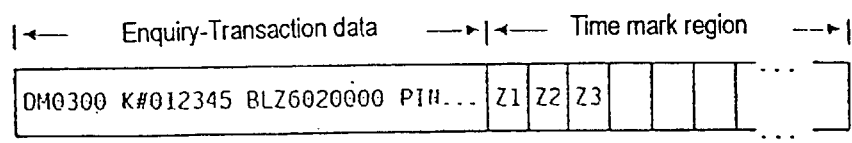
FIG. 2B shows the design of the time marks according to the invention.
Figure 2B:
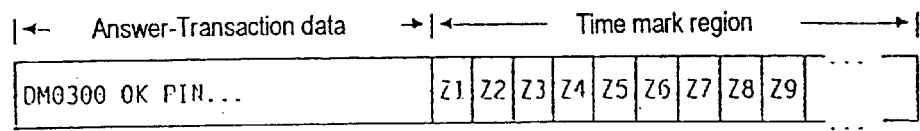

The procedure in accordance with the invention allocates an area for entries of time marks (time mark area) to each message (request/response); see FIG. 2B. As the message (request/response) runs through several processing stages as shown in FIG. 2A, the message receives a time mark (Z1, Z2, Z3, etc.) after each freely definable start and end of a processing stage. As shown in FIG. 2A, the message "Pay me a sum of DM 300", for example, contains 9 time marks by the time the desired amount is paid out. From these 9 time entries, the end-to-end response time of the respective message can be determined quickly, or the duration of individual processing stages can be determined. The individual processing stages can be freely defined by the user. Generally, the processing stage is defined by transitions of program parts, program functions or other definable interfaces.

FIG. 2B shows the principal structure of a message with the area for time entries using the example of a direct debit enquiry in a bank application.

The enquiry consists of enquiry transaction data such as desired debit amount, account number, bank sort, code, PIN number and time mark area. The time mark area contains the respective time marks which are left behind by the respective processing stage.

Preferably, each time mark consists of:
1. A Description with
   computer identification (client/server—C/S)
   a unique identification of the message in the client (request/response—e.g. 1267)
   a component describing the processing stage(e.g. queue)
2. A Value of the Computer System Time An example of a time mark of the "Create request" processing stage:

C "00001267" create request "12:00:02.100"

C stands for the identification of the computer—here it is "client"

00001267 stands for the identification of a certain request

Create request—describes the concrete processing stage

12:00:02.100 stands for the time of the request.

At the start and end of each processing stage, such a time mark can be written in the message (request/response).

The course in FIG. 2A can thus be described as follows:

1. The client program writes time marks in the message (request/response).
2. After the request is transmitted over the network to the server computer, the server program writes further time marks in the request.
3. The server creates a response and transfers the existing time marks from the request to the response.
4. During the processing of the response, further time marks are entered.
5. After the response is transmitted over the network to the client computer, the client program writes the last time mark in the response.
6. Before the response is deleted, the time marks are written to a file for further evaluation.

After such processing of the message (request and response), the file contains, for example, the following entries:

| K 00001267 | Create request | 12:00:02.100 | Z1 |
| K 00001267 | Request to network | 12:00:02.830 | Z2 |
| B 00001267 | Decode request | 12:02:08.500 | Z3 |
| B 00001267 | Check request | 12:02:08.900 | Z4 |
| B 00001267 | Create response | 12:02:09.100 | Z5 |
| B 00001267 | Response to network | 12:02:09.300 | Z6 |
| K 00001267 | Decode response | 12:00:20.600 | Z7 |
| K 00001267 | Analyse response | 12:00:21.800 | Z8 |
| K 00001267 | Execute money request | 12:00:22.900 | Z9 |

The evaluation of time marks is carried out based on the identifiers of the respective request. All time marks with the same identifier in the respective request are evaluated as follows:

1. Differences are established between the values of the respective processing stages of a request. Thus the execution time for respective processing stages are determined. In this context it is emphasised that it is not possible in general to compare system time values from different computers with one another because their clocks are not synchronised.
2. The difference between system time values at the first time mark in the request and the last time mark in the response is thus the end-to-end response time.

In addition, the network time not recorded can also be determined as follows:

Network time=response from network–request to network–(response to network–request from network).

The subdivision of network time according to request and response is not possible without a standardised system time.

The evaluation of time marks in the above stated example can be carried out as follows:

| Transaction 00001267 - time in milliseconds | | |
|---|---|---|
| K End-to-end response time (create request . . . execute money request) | | 20800 |
| K Create request | . . . request to network | 700 |
| K Request to network | . . . decode response | 17800 |
| K Decode response | . . . analyse response | 400 |
| K Analyse response | . . . execute money request | 1900 |
| B User response time (decode request - response to network) | | 800 |
| B Decode request | . . . check request | 400 |
| B Check request | . . . create response | 200 |
| B Create response | . . . response to network | 200 |
| Network time 17800 - 800 | | 17000 |

Through the integrated processing of application data and performance data, the measurement data which describe the processing stages of a transaction are contained in a response message. This has the advantage that the correlation problem here is easy to resolve, which would otherwise be very difficult. Frequently, processing stages of a transaction are inhomogenous, i.e. different processing calls do not always run according to the same pattern. As the measurement data belonging to a processing call are combined in a response message, these different paths which are taken are also easy to recognise and evaluate.

A particular advantage of this invention is that in addition to the important response times of requests/responses, other performance data such as the use of the CPU, memory, input and output units as well as the network are also written into the area set aside for performance entries and are can therefore be easily measured and evaluated.

While the invention has been particularly shown and described with respect to preferred embodiments thereof, it will be understood by those skilled in the art that the foregoing and other changes in form and details may be made therein without departing from the spirit and scope of the invention.

Having thus described our invention, what we claim as new, and desire to secure by Letters Patent is:

1. A process for measuring performance of one or more processing stages of programs or parts of programs distributed over at least one computer by means of messages communicated between said at least one computer in a data-processing system, said process comprising the steps of:
   allocating an area within a message to be processed by a program for receiving entries of performance data; and
   depositing a performance marker in said area by a particular one of said one or more processing stages, wherein performance data belonging to parts of a distributed transaction are collected in a single message.

2. The process according to claim 1, wherein the performance or time marker contains:
   an identifier of the computer,
   an identifier of the message,
   a description of the particular processing stage of the message within the particular system, and
   the performance data or value of the computer time.

3. The process according to claim 1, wherein said program may be an application program, a test program, or a service program.

4. The process according to claim 1, wherein said message contains either an enquiry to the program or a response from the program.

5. The process according to claim 4, wherein the application program runs distributed on a client and on a server, the client program generates the enquiry and forwards it to the server program, the server program responds to the enquiry, and forwards the response to the client for processing.

6. The process according to claim 1, wherein at the beginning and end of each processing stage, a performance marker and/or time marker is written into the message.

7. The process according to claim 1, wherein said processing stages are defined as transitions from the program parts or program functions or program and hardware interfaces.

8. The process according to claim 7, wherein the setting of the transitions of the individual processing stages can be freely defined by the user.

9. Data carriers, containing a program for the performance of a process according to claim 1.

10. A process for the determination and evaluation of response times of one or more processing stages of a program or parts of a program distributed over at least one computer by means of messages communicated between said at least one computer in a data-processing system, said process comprising the steps of:
    allocating an area within a message to be processed by a program for receiving time entries; and
    depositing a time marker in said area by a particular one of said one or more processing stages of the program, wherein performance data belonging to parts of a distributed transaction are collected in a single message.

11. The process according to claim 2, wherein the performance or time marker contains:
    an identifier of the computer,
    an identifier of the message,
    a description of the particular processing stage of the message within the particular system, and the performance data or value of the computer time.

12. The process according to claim 10, wherein said program may be an application program, a test program, or a service program.

13. The process according to claim 10, wherein said message contains either an enquiry to the program or a response from the program.

14. The process according to claim 13, wherein the application program runs distributed on a client and on a server, the client program generates the enquiry and forwards it to the server program, the server program responds to the enquiry, and forwards the response to the client for processing.

15. The process according to claim 10, wherein at the beginning and end of each processing stage, a performance marker and/or time marker is written into the message.

16. The process according to claim 10, wherein said processing stages are defined as transitions from the program parts or program functions or program and hardware interfaces.

17. The process according to claim 16, wherein the setting of the transitions of the individual processing stages can be freely defined by the user.

18. The process according to claim 10, wherein the total response time of a message is composed of the difference between the values of the first and last time markers of a message.

19. A process according to claim 10, wherein the network time of a message is determined from the formula: "Response from the network−Enquiry to the network−(Response to the network−Enquiry from the network")."

20. Data carriers, containing a program for the performance of a process according to claim 10.

21. A data-processing system including at least one computer, operating system software and programs or parts of programs distributed over said at least one computer, said system comprising:

a message to be processed by means of a program which contains one or more processing stages, said message contains an area for performance and/or time entries; and a particular one of said one or more processing stages of the program deposits a performance entry and/or time entry in said area, wherein performance data belonging to parts of a distributed transaction are collected in a single message.

22. The data-processing system according to claim 21, wherein the time marker contains the entries:

identifier of the computer, identifier of the message, description of the particular processing stage of the message within the particular system, and performance data and/or value of the computer time or content.

23. The data-processing system according to claim 21, wherein the time marker contains the entries:

identifier of the computer, identifier of the message, description of the particular processing stage of the message within the particular system, and performance data and/or value of the computer time or content.

* * * * *